United States Patent [19]

Hanke et al.

[11] 3,869,658

[45] Mar. 4, 1975

[54] DIRECT CURENT SUPPLY WITH RIBBLE SUPPRESSION

[75] Inventors: Martin Hanke; Hans Stiefken, both of Constance, Germany

[73] Assignee: Telefunken Compter GmbH, Kanstanz, Germany

[22] Filed: Sept. 18, 1973

[21] Appl. No.: 398,406

[30] Foreign Application Priority Data

Sept. 22, 1972 Germany ........................ 2246505

[52] U.S. Cl. ........................ 321/2, 321/10, 321/19, 323/25

[51] Int. Cl. ........................ H02m 1/14

[58] Field of Search ........... 321/1, 2, 4, 10, 18, 19, 321/27 R; 323/23, 25

[56] References Cited

UNITED STATES PATENTS

| | | | |
|---|---|---|---|
| 3,217,233 | 11/1965 | Drusch | 321/27 R |
| 3,355,653 | 11/1967 | Paradissis | 321/2 |
| 3,550,030 | 12/1970 | Blanyer | 321/10 |
| 3,571,691 | 3/1971 | Iwata | 321/18 |
| 3,743,920 | 7/1972 | Ubillos | 321/2 |

FOREIGN PATENTS OR APPLICATIONS

| | | | |
|---|---|---|---|
| 1,125,868 | 9/1968 | Great Britain | 321/19 |

*Primary Examiner*—William H. Beha, Jr.
*Attorney, Agent, or Firm*—Spencer & Kaye

[57] ABSTRACT

A circuit arrangement for supplying a direct current, which is free from interruptions, from an alternating line current. The circuit includes: a first rectifier which initially rectifies the line current; an energy store, which helps compensate for variations in the rectified voltage; an inverter for chopping up the recitified voltage; a transformer; a second rectifier arrangement; a smoothing filter; and a control device. The voltage which is generated at the output of the smoothing filter is fed to the direct current load. When the voltage across the direct current load falls below a rated value, a first electrical switching device provides an extra current to the direct current load. On the other hand, when the voltage across the direct current load increases above the rated value, a second electrical switching device diverts a portion of the current through the direct current load. In this manner, any changes in the current and voltage across the load are compensated.

6 Claims, 14 Drawing Figures

DIRECT CURENT SUPPLY WITH RIBBLE SUPPRESSION

BACKGROUND OF THE INVENTION

The present invention involves a device for converting an alternating current into a direct current.

Electrical energy is most commonly generated in the form of a three-phase alternating current. A portion of this generated energy, however, is required for supplying direct current loads and, therefore, there exists a heavy demand for conversion devices, such as rectifier circuits, which are able to transform the alternating current into a direct current. Such rectifier circuits primarily consist of a transformer having a primary winding to which the alternating current is applied and rectifier components connected to the secondary winding of the transformer, where the rectifier components allow the current to flow in only one direction.

Such rectifier circuits, which are generally utilized in forming direct current supply devices, can also include, in addition to those elements mentioned above, circuitry for smoothing the transformed and rectified direct current and a control device for monitoring the electrical parameters of current and voltage applied to the direct current load.

The outputs of the control device are connected to the primary circuit of the transformer. The control device provides feedback control signals to the primary circuit in response to changes in the electrical parameters as a result of fluctuations in the direct current load in order to compensate for such fluctuation so that a reasonably constant current and voltage are generated at the direct current load itself.

A further step in the development of such known direct current supply devices was the introduction of a static inverter. In such a known arrangement of the direct current supply device, the alternating line current is initially rectified. The resulting direct voltage is then chopped up, in response to control signals from the control device which depend on the electrical parameters at the direct current load, and the resulting alternating voltage signals are transformed and are again rectified. The double rectification and particularly the chopping up of the direct voltage obtained from the alternating current supply in the first rectifier arrangement, which includes an energy store to which the direct voltage is fed, already assures a relatively good quality for the electrical parameters applied to the direct current load.

The present invention relats to a circuit arrangement for supplying a current/voltage controlled current without interruptions to a direct current load. This type of circuit arrangement generally includes: a first rectifier arrangement for rectifying an alternating current supply; an energy store in which the direct voltage obtained from the alternating current supply is stored; an inverter circuit with phase switching control with which the direct voltage present at the energy store is chopped up; a transformer with center tapped primary and secondary windings; a second rectifier arrangement in which the transformed alternating voltage is rectified; at least one smoothing filter; and a control device for monitoring the electrical output values applied to the direct current load and for controlling the operation of the inverter circuit in dependence on the output values. Even with such an arrangement, however, there is still smoe residual ripple in the generated direct voltage.

SUMMARY OF THE INVENTION

An object of the present invention is to provide an improved circuit arrangement of the above-mentioned type so that the residual ripple still present in a direct voltge generated with the known circuit arrangements can be sufficiently eliminated.

Another object of the present invention is to achieve this result while requiring an amount of additional energy which is so small as to create a negligible reduction in the total power efficiency of the circuit arrangement.

These objectives are accomplished by providing an electrical switching device in the circuit arrangement, which device cooperates with the control unit to compensate for fluctuations so as to assure a constant current and voltage at the direct current load. For this purpose, the electrical switching device either supplies an extra current to the direct current load which has a predetermined amplitude/time characteristic or produces a voltage drop at the resistance network formed by the inverter, the transformer and the second rectifier arrangement, thereby drawing off a portion of the current from the direct current load. Thus, in accordance with the circuit arrangement of the present invention, the already regulated direct current through the direct current load is readjusted in that either an additional current is fed to the already regulated direct current load which current corresponds to the deviation between the actual and the rated current or a corresponding current is withdrawn from the direct current load via the voltage drop produced at the internal resistance of the circuit arrangement.

DESCRIPTION OF THE PREFERRED EMBODIMENTS

Figures 1, 2A:
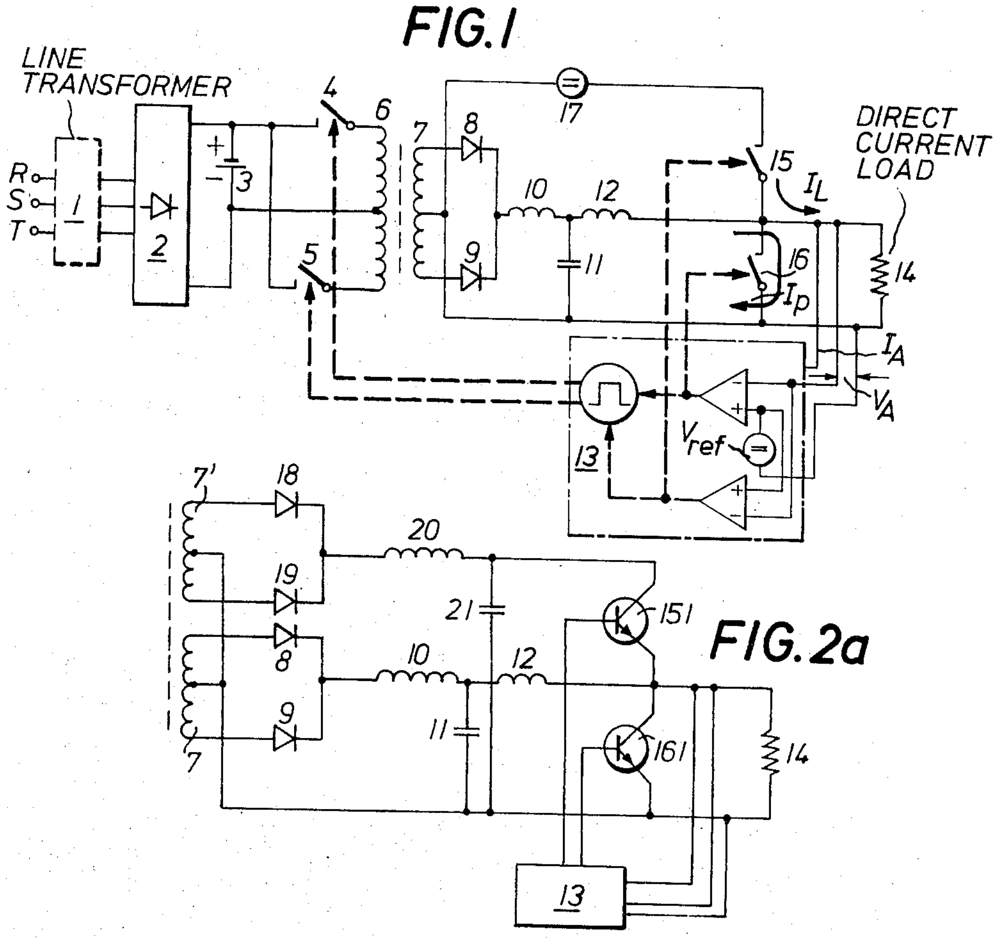
FIG. 1 is a schematic circuit diagram of one embodiment of the circuit arrangement of the present invention.
FIG. 2*a* is a circuit diagram of a first embodiment of the electrical switching device according to the present invention for eliminating the residual ripple.
Figure 2B:
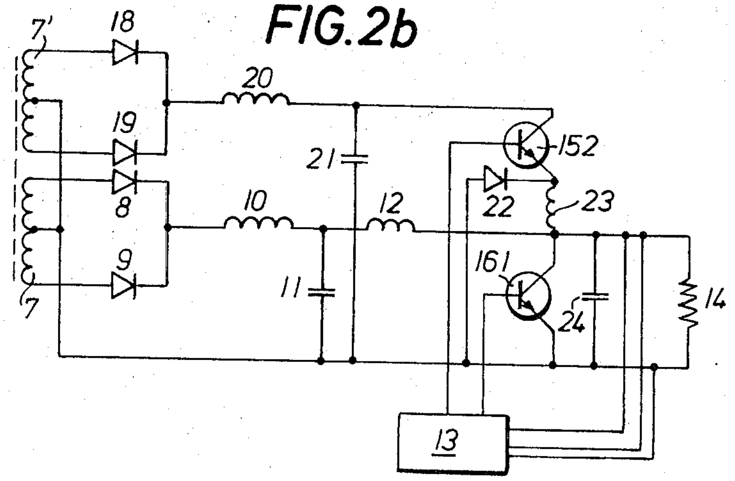
FIG. 2*b* is a circuit diagram of a second embodiment of the electrical switching device according to the present invention for eliminating the residual ripple.

As shown in FIG. 1, a line transformer 1 receives, for example, the three phases R, S, T of a three-phase line current. The phase currents are individually rectified and smoothed in a first rectifier arrangement 2, so that a direct voltage $V_B$ appears at the output of the first rectifier arrangement 2. This direct voltage $V_B$ is fed to a buffer battery 3 which acts as an energy store and serves to help compensate for fluctuations in the line current. Even if the line current should cease altogether, this buffer battery would go into action and maintain emergency operation for a given period of time thereby enabling at least the performance of certain protective measures for emergency operation of a direct current load 14.

The direct voltage $V_B$ applied to the buffer battery 3 is now converted into an alternating voltage by an inverter arrangement. The inverter includes controllable electronic switching elements 4, 5 which lie in the primary winding circuit 6 of a transformer. By regulating the moment at which these controllable electronic switching elements 4, 5 are actuated it is also possible to control, simultaneously with the chopping up of the direct voltage $V_B$, the signal amplitude in dependence upon the output value of the output voltage $V_A$ at the direct current load 14, i.e. the electronic switching elements can phase cut controlled. A control unit 13 generates control pulses which are dependent upon the output value at direct current load 14 and have a fixed, given repetition frequency of, for example, 20 kHz. The duration of the control pulses in order to provide the desired phase cut, or switching, control, will be varied so as to correspond to the respective actual output values.

The amplitude of the average voltage output produced by the switching elements 4 and 5 from the alternating line voltage can be varied by controlling the point of time during each forward voltage half-cycle at which each of the switching elements 4, 5 is switched into its conductive state. By providing during each half-cycle of operation, an appropriate phase regulating for supplying an activating signal to the respective switching element, the element will only be switched into its conductive state for a portion of its respective half-cycle. By varying the time of conduction of the switching element in this manner, the average output -voltage of the rectifier 8, 9, accordingly, can be varied. Such operation of the switching elements of the rectifier is referred to herein as phase cutting control and can be utilized for compensating for variations in the alternating line voltage and for slow variations of the direct current load.

The controllable electronic switching elements 4, 5 disposed in the primary circuit 6 of the transformer may be constituted by transistors as well as thyristors which are alternately switched into their conductive state by the control unit 13 in correspondence with the output value dependent control pulses.

When transistors are used for the electronic switching elements, they are connected via their bases with the appropriate outputs of the control unit 13 and at their collectors with one pole, for example the positive pole, of the buffer battery 3. The emitter terminals of the transistors are each connected with respectively opposite ends of the primary winding 6 of the transformer. The center tap of the transformer is connected to the other pole, for example the negative pole, of the buffer battery.

When thyristors are used for the electronic switching elements, the cathode terminals of the thyristors are generally connected with the ends of the primary winding 6 of the transformer. The anode terminals are connected with, for example, the positive pole of the buffer battery. The thyristors are controlled at their gates by the control unit 13 so that each control pulse from control unit 13 puts one of the thyristors into its conductive state. At the end of each control pulse, the current flowing through the thyristor must be interrupted.

The alternating voltage across the primary winding 6 is transformed to the secondary winding 7, in correspondence with the ratio of the number of windings in each.

The secondary winding 7 of the transformer also has a center tap and furnishes the transformed alternating current to a second rectifier arrangement. This second rectifier arrangement includes two diodes 8, 9 which are each connected at their anodes with a respective one of the ends of the secondary winding 7. The cathode terminals of the diodes 8, 9 are connected together. The direct voltage for the direct current load 14 is that voltage which appears between the common cathode point and the center tap of the secondary winding 7 of the transformer.

The direct voltage is smoothed via a smoothing filter, which includes inductive and/or capacitive smoothing elements 10, 11, 12 so that any residual ripple in the voltage is limited to about only 1 percent of the absolute value.

The first and second rectifier arrangements can also be realized by a bridge circuit.

The values of the electrical output current $I_A$ and voltage $V_A$ present at the direct current load 14 are monitored in the control unit 13 where they are compared with corresponding rated values with respect to both their absolute value and quality. Deviations that do occur are compensated for by the appropriate variation in the phase cut control.

In order to be able to compensate for any remaining ripple in the direct voltage and possibly also any sudden changes in the load of the direct current load without any delays, the circuit arrangement of the present invention includes an electrical switching device which, depending on the polarity of the deviation of the voltage and current at the output from the rated values or the change in the load, supply current to the direct current load or remove current therefrom, by producing a voltage drop at the resistance network.

The primary purpose of the electrical switching device provided by the present invention is to counteract decreases or increases in the current flowing in the direct current load. For this purpose, the present invention utilizes a combination of a series regulator and a parallel regulator. The series regulator is provided to compensate for decreases in the load current and the parallel regulator is provided to compensate for increases in the load current. The circuit arrangement according to the present invention of the series and parallel regulators has the particular advantage of providing substantially immediate compensations for a sudden change in the load. Thus, with such an arrangement, it is not necessary to wait out the reaction time of the phase cutting control in the primary circuit of the transformer in order to obtain compensation of any sudden change in the direct voltage at the output.

In the schematic circuit diagram shown in FIG. 1, the electrical switching device is shown as a set of switches 15 and 16, which are controlled by the control unit 13. The series regulator is represented by switch 15 and the shunt regulator by switch 16.

If a deviation of the direct output voltage from the arithmetic mean value (rated value) toward higher values is noted in the control unit 13, then the switching path of the shunt regulator 16 is closed in order to reduce the excess voltage and current. Thus a portion of the current flowing from the cathode terminal of diodes 8, 9 to the direct current load 14 is diverted, while the voltage $V_A$ at the direct current load 14 remains constant.

If the control unit 13 detects a deviation of the direct voltage at the output toward lower values, the control path of the series regulator 15 is closed. Upon closing the path of the series regulator, the circuit of an auxiliary voltage source 17 is closed which thus is able to transmit energy to the direct current load 14. The current, therefore, is fed into the direct current load 14 via this auxiliary voltage source 17. The auxiliary voltage source 17 is coupled between the center tap of the secondary winding 7 of the transformer and the switch 15 of the series regulator.

The control unit 13 includes, as shown in FIG. 1, a reference voltage $V_{ref}$ and two operational amplifiers, which compare the output voltage $V_A$ with the reference voltage $V_{ref}$ and which produces a pair of output signals for controlling either the series regulator 15 or the shunt regulator 16. Furthermore the control unit 13 includes a pulse generator, which is controlled by the output signals of said operational amplifiers and which supplies the switching elements 4, 5 with said control pulses, which are responsible for the phase cutting control. The control means for controlling the output current $I_A$ are not shown in detail, because they may be realized in a manner analogous to that for controlling the output voltage.

Two alternative embodiments of the auxiliary voltage source 17 are illustrated in FIGS. *2a* and *2b*. The auxiliary voltage source includes a third rectifier arrangement, which has two diodes 18, 19. The diodes 18, 19 are each connected at their anodes with respectively opposite ends of another secondary winding 7' which is magnetically coupled with the primary winding 6 of the transformer. The cathode terminals of diodes 18, 19 are connected together so that a direct voltage is produced. Their output and this direct voltage are smoothed by inductive and/or capacitive smoothing elements 20, 21. This smoothed direct voltage is then fed to the series regulator 15.

In accordance with the embodiment shown in FIG. *2a*, the series regulator is realized by an npn transistor 151, which is controlled at its base by the control unit 13. When transistor 151 is switched into its conductive state, a direct output current is fed into the direct current load 14 via the collector-emitter path of this transistor 151.

The shunt regulator 16, in the embodiment of FIG. *2a*, is also realized by an npn transistor 161, which is also controlled at its base by the control unit 13, in the same manner as the transistor 151 of the series regulator. Transistor 161 of the shunt regulator has its collector-emitter path connected in parallel with the direct current load, with its collector also being connected, via the inductive and/or capacitive smoothing elements 10, 11, 12, with the common cathode terminal of diodes 8, 9 of the second rectifier arrangement and its emitter with the center tap of the secondary winding 7 of the transformer. When the transistor 161 is switched into its conductive state, current is diverted from the direct current load 14, via the collector-emitter path of transistor 161 of the shunt regulator so as to compensate for any possible excess voltage across the direct current load 14.

FIG. *2b* shows another embodiment according to the present invention, which differs from that shown in FIG. *2a* only by the different realization of the series regulator. The series regulator is here realized by a so-called switching regulator which draws current from the auxiliary voltage source with a high direct voltage, which is formed in the same manner as shown in FIG. *2a*. The transistor 152 is also controlled at its base by control unit 13. When the transistor is switched into its conductive state, however, it does not directly affect the direct current load 14, but instead supplies current to an inductance 23 which then transmits its energy to the direct current load 14. A capacitor 24 is arranged in parallel with the direct current load 14 and thus also with the shunt regulator 161. This capacitor 24 together with inductance 23 forms a filter. If the direct output voltage at the direct current load 14 drops below the rated value, energy is first taken from capacitor 24 before the current flowing through transistor 152, when it is switched into its conductive state, becomes effective. The cathode terminal of a diode 22 is connected with the connecting point of the emitter terminal of the switching transistor 152 and the inductance 23 and the anode terminal of this diode 22 is connected with the line leading to the center tap of the secondary winding. The diode 22 permits the current to continue to flow even when transistor 152 is blocked.

A primary requirement with respect to both the series and shunt regulators in accordance with the present invention as illustrated in detail in FIGS. *2a* and *2b*, is that it must be possible to provide a linear amplification with the regulators. Thus, the present invention is not limited to these particular embodiments, rather other linear amplifying elements or circuits can also be used if their operation is similar to that of the transistors.

The operation of the circuit arrangement according to the present invention will be explained in detail with the aid of the diagrams shown in FIGS. 3 and 4. The chopping frequency of the static inverter has been selected, in order to simplify the illustrations, to be equal to the frequency of the line supply. In practical circuit arrangements, however, a substantially higher chopping frequency is employed, which, as already mentioned, may be 20 kHz, for example.

As shown in FIG. *3a*, the three phases R, S, T of a three-phase line voltage are shifted with respect to one another by $\frac{2}{3}\pi$ and have the voltage amplitudes $\pm V_{line}$. The phases are initially full-wave rectified in the first rectifier arrangement, as shown in FIG. *3b*. The resulting direct voltage $V_B$, whose average direct voltage component is approximately $1.66 \cdot V_{max}$ (where $V_{max}$ is the peak value of the three phases R, S, T), is fed to the buffer battery and is chopped at a given constant repetition frequency with the aid of the inverter elements 4 and 5.

The relationship of the control pulse sequences for the inverter elements, with respect to one another, must follow the condition that between each two control pulses for one of the elements there must occur a control pulse for the other element. If one control pulse with its subsequent pulse interval is considered as a unit of time, the second sequence of control pulses must be shifted by one-half a unit with respect thereto. The sequence of positive and negative rectangular pulses, $V_Z$, resulting from the inversion and simultaneous phase cut control is shown in FIG. 3*c*.

Figures 3, 3A, 3B, 3C, 3D, 3E, 3F, 3G:
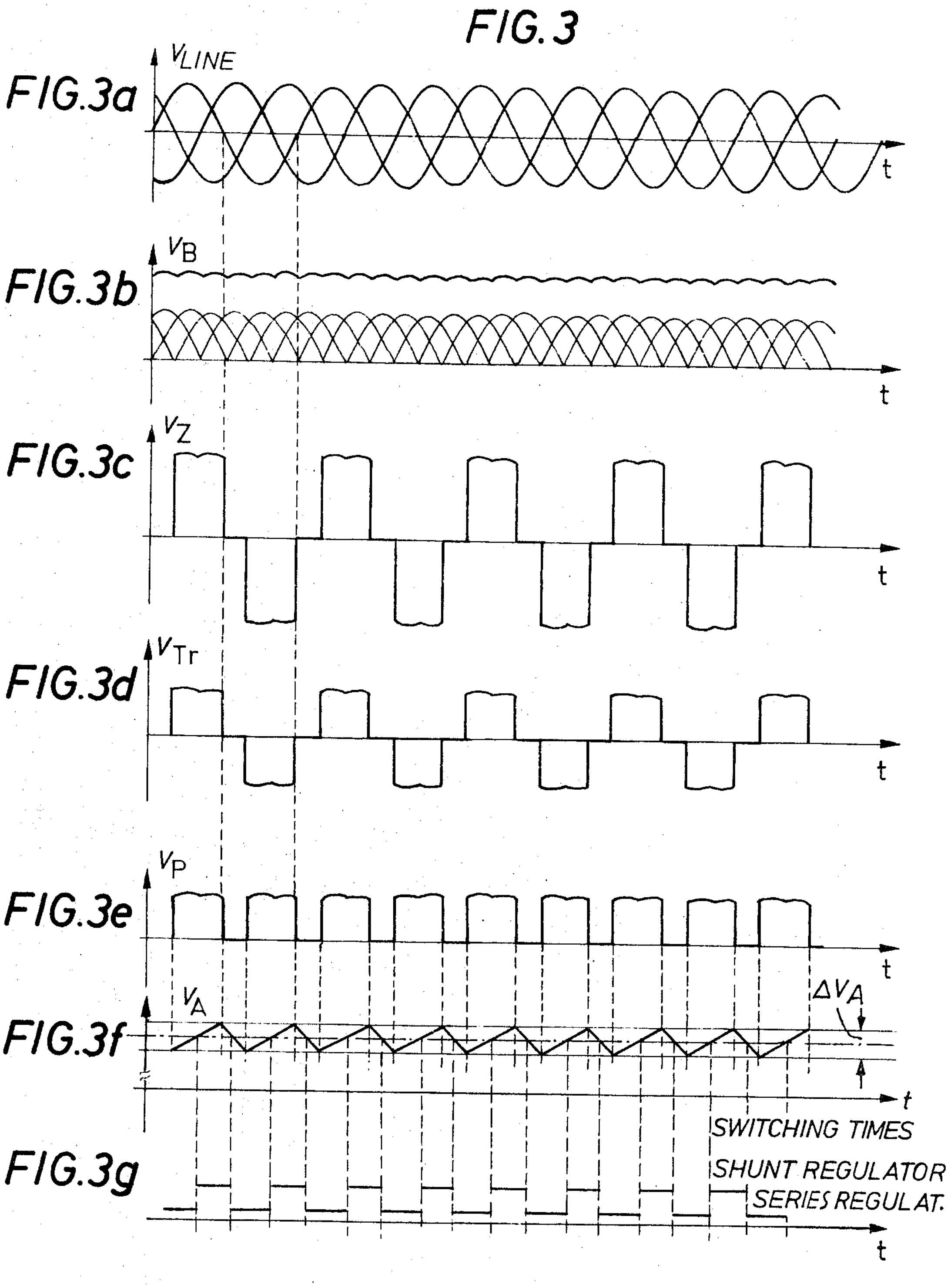
FIGS. 3 *a–g* are waveform diagrams of the voltages produced at various points in the circuit arrangement according to the present invention with an indication of the switching times for the electrical switching device responsible for the elimination of the residual ripple.

This rectangular alternating voltage $V_z$ is now passed through the transformer, as shown in FIG. 3*d*, and thereby is decreased in amplitude, $V_{Tr}$. The transformed voltage $V_{Tr}$ is rectified in the second rectifier arrangement. Thus there results the sequence of unipolar, for example positive, rectangular pulses, $V_P$, as shown in FIG. 3*e*.

After these pulses $V_P$ pass through the inductive and/or capacitive smoothing elements, which are connected in series with the second rectifier arrangement, there then results the direct voltage shown in FIG. 3*f*, whose residual ripple is determined primarily by the time constants of the inductance and capacitance of the smoothing elements. Thus there appears at the output of the circuit a direct voltage $V_A$ with a superimposed alternating voltage which in a first approximation has a triangular shape. The amplitude of this alternating voltage is a measure of the residual ripple of the direct voltage at the output and is shown in FIG. 3*f* by the reference marker $\Delta V_A$.

The primary object of the present invention is to substantially compensate for this residual ripple. For this purpose the present invention provides a circuit arrangement which includes a combination of a series regulator and a shunt regulator. As explained above, the series regulator compensates for increases in the load current and the shunt regulator compensates for reductions in the load current. In order to illustrate this, the switch-on times of the series and shunt regulators are indicated in FIG. 3*g*. During the period in which the voltage $V_A$ lies below the rated value, the series regulator is switched on and then feeds an additional current into the direct current load so that the voltage is raised to the rated value. If the voltage $V_A$ exceeds the rated value, the control unit activates the shunt regulator so that it produces with the additionally drawn current a voltage drop across the resistance network formed by the transformer, the second rectifier arrangement and the filter formed by the inductive and/or capacitive smoothing elements, so that the excess voltage is compensated out.

Furthermore, with the circuit arrangement according to the present invention, it is possible to compensate for the fluctuations in the voltage which occur when there is a sudden change in the direct current load which thereby causes a corresponding sudden change in the current. FIGS. 4*a–d* illustrate an example for the amplitude/time curve of the compensating current flowing through the series and shunt regulators when a sudden change in the load current at the direct current load occurs.

Figures 4, 4A, 4B, 4C, 4D:
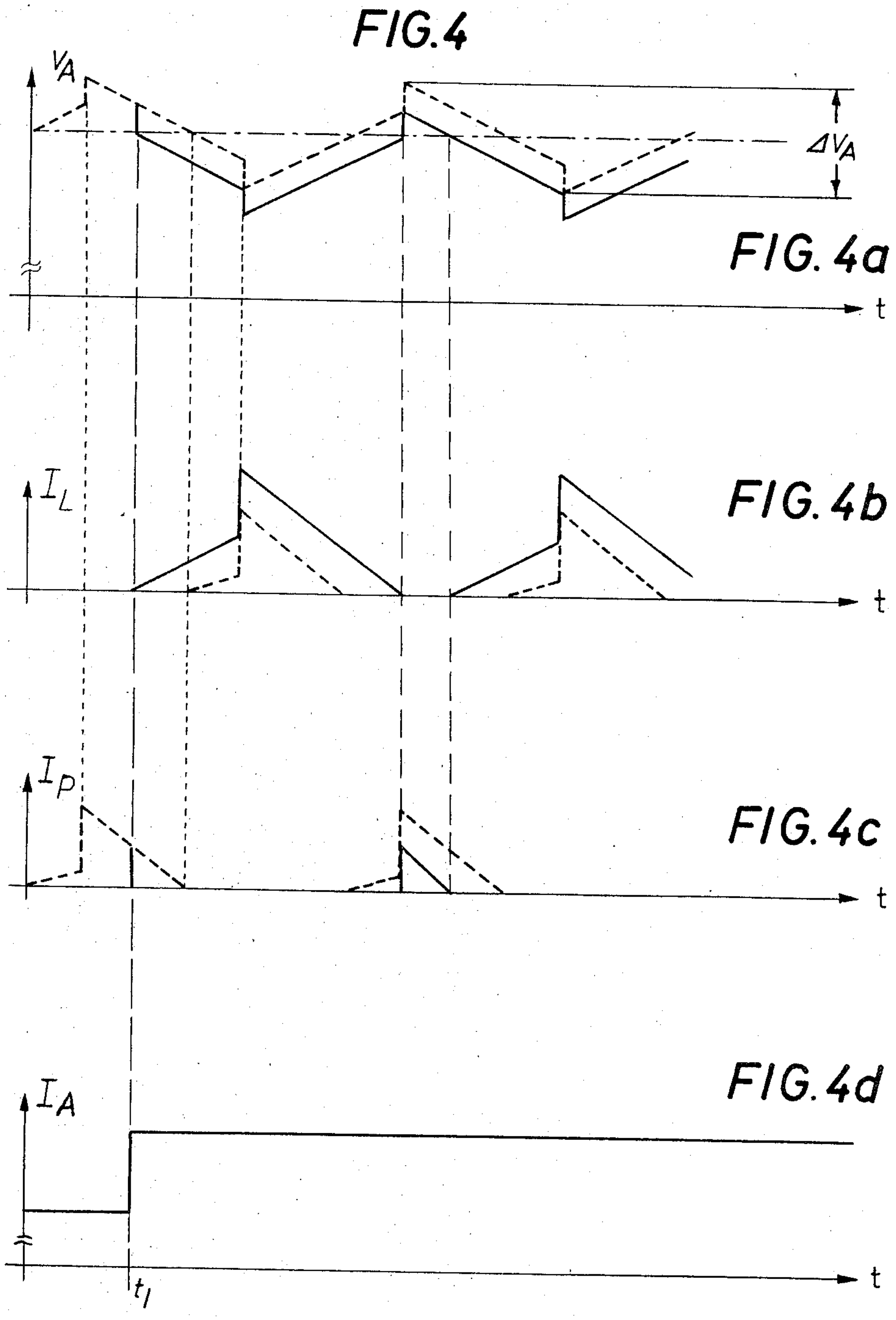
FIGS. 4*a–d* are waveform diagrams of the development of the amplitude/time curve of the current to be fed to the direct current load which results from the voltage drop at the resistance network upon a sudden change in current which occurs due to a fluctuation in the load at the direct current load.

The dashed curve in FIG. 4*a* shows the triangularly shaped alternating voltage which fluctuates with its residual ripple $\Delta V_a$ about the arithmetic mean of the direct output voltage $V_A$ as shown by the dot-dash lines. This triangular alternating voltage, however, is an idealized representation. The currents of the series and shunt regulators, which are shown in FIGS. 4*b* and 4*c*, act to compensate for the decrease or excess in voltage at the direct current load, in the manner described above in connection with FIG. 3. The current $I_L$ coming from the series regulator is illustrated in FIG. 4*b* and the current $I_P$, which is to be compensated by the shunt regulator, is illustrated in FIG. 4*c*. In FIGS. 4*b* and 4*c*, the solid lines illustrate the necessary compensating currents when there is a sudden change in the load while the dashed lines illustrate the necessary currents when there is not such sudden change. The amplitude/time relationship of currents $I_l$ or $I_P$, respectively, and the direct output voltage $V_A$ or its residual ripple are directly associated with each other.

If at a time $t_1$, the direct current load suddenly changes, then a correspondingly sharp change would occur in the load current flowing through the direct current load, as shown in FIG. 4*d*.

If the circuit arrangement was operated without the combination of the series and shunt regulators as provided by the present invention and the arrangement were left to fend for itself, the voltage curve shown in a solid line in FIG. 4*a* would initially result since the change in the load current, in accordance with the energy laws, would cause the same sudden change in the direct output voltage. Although this change would be eliminated by a change in the phase cut control, there is a time delay before such compensation is provided, with the period of the delay depending on the system involved. The circuit arrangement according to the present invention, however, permits an almost delay-free compensation of the voltage fluctuations resulting from changes in the load current.

At time $t_1$, the series regulator becomes effective until the momentary value of the direct output voltage has reached the rated value. For the short time when there is excess voltage, the shunt regulator becomes effective and then the series regulator takes over again. The basic frequency for the control of the series and shunt regulators would generally be of a higher repetition frequency than that of the sequence of control pulses for the phase cut control in the first rectifier arrangement.

The combination of the series and shunt regulators, as provided by the present invention, permits a compensation of the residual ripple in a direct voltage produced by the inversion and rectification to an amount of $\Delta V_A$ which is approximately 1 mV. Any possible sudden changes in the direct current load also can be compensated for with the arrangement of the present invention almost without any delay and thereby assure high continuity of the output values $V_A$ and $I_A$.

An additional special advantage of the circuit arrangement according to the present invention is that the series and shunt regulators need to be dimensioned only to handle a portion of the load current flowing through the current load.

It will be understood that the above description of the present invention is susceptible to various modifications, changes and adaptations and the same are intended to be comprehended within the meaning and range of equivalents of the appended claims.

We claim:

1. In a circuit arrangement for supplying an interruption-free current for a direct current load, the arrangement including a first rectifier, connected to receive an alternating supply voltage, for rectifying the supply voltage; an energy store coupled to the output of the first rectifier for storing the rectified voltage; inverting means with phase cut control for chopping up the rectified voltage into an alternating voltage; a transformer with a primary winding coupled to the inverting means for receiving the chopped voltage and a first secondary winding with both the primary and secondary windings having center taps; a second rectifier coupled to the first secondary winding of the transformer for rectifying the chopped voltage; a smoothing filter coupled to the output of the second rectifier and having its output connected to the direct current load; and control means for monitoring the current and voltage values at the direct current load and for controlling the inverting means in dependence upon these values; the improvement comprising: first electrical switching means coupled to the output of said control means and connected for providing an extra current to said direct current load in response to control signals received from said control means when the voltage across said direct current load falls below a rated value; and second electrical switching means coupled to the output of said control means and connected for diverting a portion of the current through said direct current load in response to control signals received from said control means when the voltage across said direct current load increases above a rated value.

2. A circuit arrangement as defined in claim 1 wherein said first electrical switching means is a series voltage regulator and said second electrical switching means is a shunt voltage regulator.

3. A circuit arrangement as defined in claim 2 wherein said series regulator includes a first transistor having its base coupled to an output of said control means such that said first transistor is switched into its conductive state in dependence upon the current and voltage values monitored by said control means and said shunt regulator includes a second transistor having its base coupled to an output of said control means such that said second transistor is switched into its conductive state in dependence upon the current and voltage values monitored by said control means.

4. A circuit arrangement as defined in claim 3, further comprising an auxiliary voltage source; and wherein: said first transistor of said series regulator has its collector-emitter path coupled between the output of said auxiliary voltage source and said direct current load such that when said first transistor is switched into its conductive state by said control means, said auxiliary source supplies current into said direct current load; and said second transisttor of said shunt regulator has its collector-emitter path connected in parallel with said direct current load such that when said second transistor is switched into its conductive state by said control means, it diverts a portion of the current through said direct current load and produces a voltage drop across a resistance network formed by said inverter, said transformer and said second rectifier so as to reduce the output voltage across said direct current load.

5. A circuit arrangement as defined in claim 4 wherein said auxiliary voltage source comprises a second secondary winding inductively coupled with said primary winding of said transformer and a third rectifier coupled between the output of said second secondary winding and said collector-emitter path of said first transistor.

6. A circuit arrangement as defined in claim 2 wherein said series voltage regulator includes a switching regulator having a switching transistor and an inductor.

* * * * *